US010073416B2

(12) United States Patent
Bang et al.

(10) Patent No.: US 10,073,416 B2
(45) Date of Patent: Sep. 11, 2018

(54) METHOD FOR PRODUCING A HOLOGRAPHIC OPTICAL ELEMENT

(71) Applicants: LG Display Co., Ltd., Seoul (KR); Bayer MaterialScience AG, Leverkusen (DE)

(72) Inventors: Hyungseok Bang, Goyang-si (KR); Heejin Im, Paju-si (KR); Guensik Lee, Seoul (KR); Friedrich-Karl Bruder, Krefeld (DE); Thomas Peter Facke, Leverkusen (DE); Marc-Stephan Weiser, Leverkusen (DE); Rainer Hagen, Leverkusen (DE); Thomas Rolle, Leverkusen (DE); Horst Berneth, Leverkusen (DE); Dennis Honel, Zülpich (DE); Günther Walze, Köln (DE)

(73) Assignees: LG Display Co., Ltd., Seoul (KR); Bayer MaterialScience AG, Leverkusen (DE)

( * ) Notice: Subject to any disclaimer, the term of this patent is extended or adjusted under 35 U.S.C. 154(b) by 29 days.

(21) Appl. No.: 14/695,610

(22) Filed: Apr. 24, 2015

(65) Prior Publication Data

US 2016/0313696 A1  Oct. 27, 2016

(51) Int. Cl.
  *G03H 1/04*   (2006.01)
  *G03H 1/02*   (2006.01)
  *G02B 5/32*   (2006.01)

(52) U.S. Cl.
  CPC ......... *G03H 1/0402* (2013.01); *G03H 1/0252* (2013.01); *G03H 1/04* (2013.01);
  (Continued)

(58) Field of Classification Search
  CPC .. G03H 1/0402; G03H 2001/043; G03H 1/04; G03H 1/0252; G03H 1/0486;
  (Continued)

(56) References Cited

U.S. PATENT DOCUMENTS 223,898 A * 1/1880 Edison ............... H01K 3/00
  201/25
3,704,130 A * 11/1972 Pollet et al. ............. G03C 1/06
  430/2

(Continued)

FOREIGN PATENT DOCUMENTS

CN      103660617 A    3/2014
JP      H02-157708 A   6/1990
(Continued)

OTHER PUBLICATIONS

Supertzi et al. "Wide-Angle Holography" J. Opt. Soc. Am. 56(4), 524-525, 1966.*
(Continued)

*Primary Examiner* — Zachary Wilkes
*Assistant Examiner* — George G King
(74) *Attorney, Agent, or Firm* — Fenwick & West LLP

(57) ABSTRACT

The invention relates to a method for producing a holographic optical element by providing a recording stack comprising at least one recording element laminated on at least one supporting element, irradiating at least a part of the recording stack with at least one recording beam in an irradiating step, wherein during the irradiating step, the recording stack bends, providing a bending deviation threshold for the recording stack, and adjusting at least one first process parameter such that an expected maximum bending deviation of the recording stack does not exceed the bending deviation threshold, wherein the at least one first process
(Continued)

parameter influences the bending behavior of the recording stack during the irradiating step.

9 Claims, 5 Drawing Sheets

(52) U.S. Cl.
CPC ............ *G03H 1/0486* (2013.01); *G02B 5/32* (2013.01); *G03H 1/0272* (2013.01); *G03H 2001/026* (2013.01); *G03H 2001/0264* (2013.01); *G03H 2001/043* (2013.01); *G03H 2001/0439* (2013.01); *G03H 2240/43* (2013.01); *G03H 2240/52* (2013.01); *G03H 2240/55* (2013.01); *G03H 2270/11* (2013.01)

(58) Field of Classification Search
CPC ........... G03H 1/0272; G03H 2001/026; G03H 2001/0264; G03H 2001/0439; G03H 2240/43; G03H 2240/52; G03H 2240/55; G03H 2270/11; G02B 5/32
USPC ...................................... 359/1–35
See application file for complete search history.

(56) References Cited

U.S. PATENT DOCUMENTS

| | | |
|---|---|---|
| 8,254,418 B2 | 8/2012 | Smith et al. |
| 2012/0302659 A1* | 11/2012 | Rolle ................ G03F 7/001 522/173 |
| 2014/0049734 A1* | 2/2014 | Erinjippurath ....... G09G 3/3611 349/96 |

FOREIGN PATENT DOCUMENTS

| | | |
|---|---|---|
| JP | H05-165388 A | 7/1992 |
| JP | 2003-322713 A | 11/2003 |
| JP | 2004-020813 A | 1/2004 |
| JP | 2007-017521 A | 1/2007 |
| JP | 2007-148038 A | 6/2007 |
| JP | 2008-076674 A | 4/2008 |
| JP | 2009-059414 A | 3/2009 |
| TW | 201037032 A | 10/2010 |
| TW | 201351404 A | 12/2013 |

OTHER PUBLICATIONS

Kodak Data Release "Kodak Materials for Holography" pdf file created 2003.*
3M "Display Enhancement Solutions" webpage, 2012.*
CRC Handbook of Chemistry and Physics, 65th edition, p. F-56, 1984-1985.*
Taiwan First Office Action, Taiwan Application No. 105112652, dated Oct. 20, 2016, 13 pages.
Boyd, J.E. et al., "Effect of Film Thickness on the Performance of Photopolymers as Holographic Recording Materials," Applied Optics, May 10, 2000, pp. 2353-2358, vol. 39, No. 14.
Rhee, U-S. et al., "Dynamics of Hologram Recording in DuPont Photopolymer," Applied Optics, Feb. 10, 1995, pp. 746-853, vol. 34, No. 5.
Moothanchery, M., "Studies of Shrinkage in Photopolymerisable Materials for Holographic Applications," Doctoral Thesis, Dublin Institute of Technology, Oct. 22, 2013, pp. 1-205.
Wu, S-D. et al., "Characteristics of DuPont Photopolymers for Slanted Holographic Grating Formations," Journal of the Optical Society of America—B, Oct. 2004, pp. 1722-1731, vol. 21, No. 10.
European Extended Search Report, European Application No. 16166372.9, dated Sep. 13, 2016, 17 pages.
Japanese Office Action, Japanese Application No. 2016-086831, dated Mar. 28, 2017, 10 pages.

* cited by examiner

METHOD FOR PRODUCING A HOLOGRAPHIC OPTICAL ELEMENT

BACKGROUND

Field of the Invention

The invention relates to a method for producing a holographic optical element wherein a recording stack comprising at least one recording element laminated to at least one supporting element is provided, wherein the recording stack is irradiated by at least one recording beam. The invention relates also to a holographic optical element produced by this method and a display device comprising this holographic optical element.

Discussion of the Related Art

Nowadays, liquid crystal displays are often used in electronic applications. Example applications include mobile devices, game computers, tablet computers, monitors, television devices, advertising panels, and the like. Liquid crystal displays comprise a layer or panel with liquid crystals cells which can be driven electrically. In particular, the polarisation of the light illuminated by the display can be controlled depending on the voltage applied to the liquid crystals cells. Since these panels produce no light of their own a backlight unit has to be provided to illuminate the panels.

Thereby, a general concern is to provide a liquid crystal display having a high display quality. Backlight units which enable a liquid crystal display to fulfil these requirements are backlight units comprising a holographic optical element, in particular, beam shaping holographic optical element. A beam shaping holographic optical element is configured to illuminate a defined area at a defined distance from the beam shaping holographic optical element in a homogenous manner. For instance, the liquid display panel, a lens, a diffusor, or the like may be arranged at the defined area. In particular, by recording an element comprising any suitable recording material with a desired pattern, a beam shaping holographic optical element can be produced. It shall be understood that there are a plurality of further application requiring a beam shaping holographic optical element with good steering qualities, like e.g. signal lighting, projection systems or optical combiners.

In particular, holographic optical elements are the preferred choice for slim optical devices which have to facilitate very complex optical functions, like in e.g. head up (HUD) and head mounted display (HMD) and in autostereoscopic 3D displays (ASD). Especially with the increasing use of light emitting diodes (LED) and laser diodes (LD) as light sources, the advantages of holographic optical elements can be fully exploited.

For producing a holographic optical element, a recording element can be laminated on a supporting element. Then, the recording element can be irradiated by at least one recording beam for a predefined exposure time for generating the holographic optical element having a desired pattern. Generally, it is desired to produce a holographic optical element having a high quality. In particular, it is an objective to produce a holographic optical element with homogeneous diffraction efficiency.

However, a problem of the known recording schemes is that so called fringes can occur. Fringes appear on a holographic optical element as dark and bright rings. In particular, it is difficult to produce large area holographic optical elements without such fringes.

More particularly, fringe formation simply spoils the function and the quality of the holographic optical element. If the holographic optical element is used to be looked into it, for example if it serves as a view box, the fringe is simply visible as dark area in the holographic optical element plane. If the holographic optical element is used to reconstruct for example the real image of a diffusor which could serve as a spatially well defined light source, the fringe simply reduces the diffraction efficiency of the holographic optical element.

SUMMARY

Embodiments relate to producing holographic optical element. A recording stack includes at least one recording element laminated on at least one supporting element. At least a part of the recording stack with at least one recording beam is irradiated in an irradiating step. During the irradiating step, the recording stack bends. The recording stack is configured to have a bending deviation threshold. At least one first process parameter is adjusted such that an expected maximum bending deviation of the recording stack does not exceed the bending deviation threshold. The at least one first process parameter influences the bending behaviour of the recording stack during the irradiating step.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2b is a schematic side view of the embodiment shown in FIG. 2a.

FIG. 4b is a schematic side view of the embodiment shown in FIG. 4a.

DETAILED DESCRIPTION OF THE INVENTION

Figure 1:
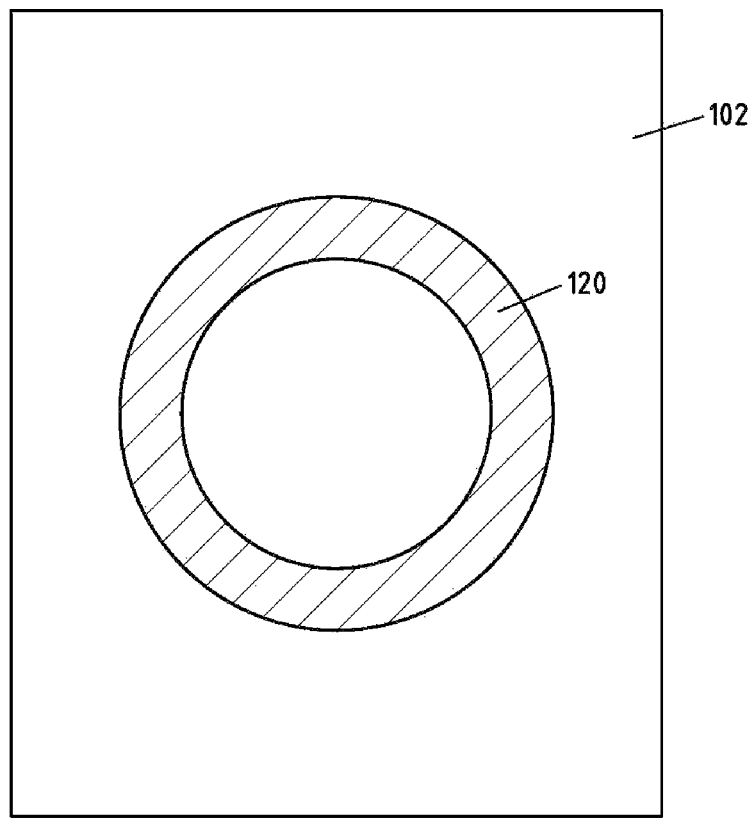
FIG. 1 is schematic view of an exemplified holographic optical element having a fringe.

The occurrence of fringes in produced holographic optical elements can be at least reduced according to the embodiments by setting at least one first process parameter prior to the irradiating step in such a way that an expected maximum bending deviation of the recording stack caused by the irradiation of the recording stack does not exceed an admissible bending deviation threshold.

According to the embodiment, a recording stack comprising a recording element and a supporting element is provided. The recording element is laminated to the supporting element. The recording element and/or the supporting element may be a planar plate. The recording element is the element to be recorded by a desired pattern and information, respectively. After the recording process, the recording element is the produced holographic optical element. The recording element is made of a suitable holographic optical material which can be recorded. The holographic optical material may be provided as a sheet material. By recording the recording element, in particular, the holographic optical material of the recording element, the holographic optical element is produced. The supporting element may be a transparent or translucent element onto which the recording element can be laminated. The recording stack, in particular, the recording element can be irradiated with at least one light beam for recording the desired pattern.

It has been found that the reason for the undesired occurrence of fringes is an asymmetric heating of the recording stack during the irradiating step, wherein the asymmetric heating causes an undesired bending of the recording stack. In particular, if the maximum bending exceeds a particular bending threshold, fringes may occur on the holographic optical element. For reducing the risk of the occurrence of fringes, at least one adjustable first process parameter is set such that the expected maximum bending deviation caused by the irradiation process does not exceed the bending deviation threshold.

The expected maximum bending deviation of the recording stack means the maximum displacement of a point of the recording stack from an initial position or initial state of the recording stack prior to the irradiating step to a maximum bending position during or after the irradiating step, wherein the bending is caused by the irradiation. By the above definition the maximum displacement, the maximum bending deformation and the bending deviation threshold are understood to have values larger or equal to zero. Normally, the maximum displacement occurs in the center of the recording stack. The bending deviation may be the normalized thickness coordinate z/h which is centred in the neutral plane of the recording stack.

Prior to the irradiating step, it is generally necessary to adjust the recording setup. It has been found that at least some of the process parameters, namely first process parameters, influence (directly) the bending behaviour of the recording stack. In particular, by setting a first process parameter the bending deviation can be reduced or increased. According to the present method, at least one of these first process parameters is adjusted such that the expected maximum bending deviation which can be estimated or calculated prior to the irradiation does not exceed the bending deviation threshold. It shall be understood that two or more first process parameters can be adjusted for meeting the bending deviation threshold.

Since a critical or admissible bending threshold is not exceeded during or after the irradiating process, a holographic optical element can be produced which does not comprise fringes. A holographic optical element of high quality can be generated.

According to a first embodiment of the method according to the invention, the first process parameter is the ratio of the lateral dimensions of the recording stack to the thickness of the recording stack, the coefficient of thermal expansion of the recording stack, the fill factor of the recording element area versus the supporting element area and/or the exposure time at a fixed recording dosage. It has been found that the bending behaviour of a recording stack depends on these first process parameters.

For instances, the expected maximum bending deviation of a recording stack can be reduced if the ratio of the lateral dimensions of the recording stack to the thickness of the recording stack is reduced. The lateral dimensions may be the height and width of a rectangular recording stack or may depend on the radius of a circular recording stack. The ratio can be reduced by increasing the thickness of the recording stack and/or reducing the lateral dimensions of the recording stack. Since normally a large area holographic optical element should be produced, the reduction of the lateral dimensions is not a preferred choice. It is more preferable to increase the thickness of the recording stack, in particular, the thickness of the supporting element while the thickness of the recording element remains unchanged. Reason for that is to obtain a thin holographic optical element. It is noted that it has been found that increasing the recording stack thickness will not reduce recording stack bending in all cases but only if a critical value of the thickness has been overcome.

Alternatively or additionally, the fill factor can be reduced e.g., by increasing the area of the supporting element or by reducing the area of the recording element (which is not a preferred choice) for reducing the bending deviation of the recording stack.

By amending geometric properties of the recording stack, the bending deviation of the recording stack can be reduced in an easy manner.

Furthermore, the absolute value of the coefficient of thermal expansion (CTE) at 25° C. of the recording stack can be reduced to reduce the maximum bending deviation of the recording stack. In a preferred embodiment, for reducing the absolute value of the CTE of the recording stack a supporting element having a low absolute value of the CTE can be used. For instance, a supporting plate made of a glass material with low absolute values of the CTE can bring down the deformation to an uncritical level. It is important to recognize that the CTE parameter or factor can be totally decoupled from the recording stack geometry and the properties of the photopolymer formulation, when the CTE is essentially zero. Hence a supporting element with a low absolute value of the CTE will reduce bending deformation in all circumstances.

Beneficial supporting plates made of glass are e.g. borosilicate glasses e.g., Borofloat® (Schott AG, Mainz, Germany), Supremax® (Schott AG, Mainz, Germany), Duran® (DURAN Group GmbH, Mainz), Corning® Eagle XG® (Corning, N.Y., USA), Simax® (Kavalierglass a.s., Sazava, Check Republic) with a CTE of $3.3 \times 10^{-6}$ $K^{-1}$, glass having CTE lower than a threshold such as Nextrema® (Schott AG, Mainz, Germany), fused silica like Vycor® 7913 (Corning, N.Y., USA), Corning® 7980 (Corning, N.Y., USA) with a CTE less than $1 \times 10^{-6}$ $K^{-1}$, zero CTE ceramic glasses e.g. Robax® (Schott AG, Mainz, Germany), Clearceram® (Ohara Inc., Kanagawa, Japan), Zerodur® (Schott AG, Mainz, Germany) with a CTE less than $0.1 \times 10^{-6}$ $K^{-1}$ fused silica e.g., GE124 (Volume Precision Glass Inc., Santa Rosa, Calif., USA) or fused quartz.

In particular, a supporting element having an absolute value of the CTE equal to or smaller than $7 \times 10^{-6}$ $K^{-1}$, preferably equal to or smaller than $1 \times 10^{-6}$ $K^{-1}$ can be used. In a preferred embodiment, the supporting element may be a glass plate, in particular, a float glass plate, ceramic glass plate, a fused silica or a fused quartz plate. The ceramic glass plate and the fused silica glass plate have a particular low absolute value of the CTE, and can thus be advantageously used.

Alternative or additionally to the adjustment of the previously described first process parameters, the exposure time or equivalently the recording power density at a fixed recording dosage can be adapted for reducing the expected maximum bending deviation. Thereby, the recording dosage E relates via the total power density P to the exposure time $t_{exp}$ as follows:

$$E = P \cdot t_{exp} \qquad (a)$$

The maximum bending deviation can be reduced if the power density P is reduced. In other words, increasing the exposure time $t_{exp}$ at fixed recording dosages E reduces the expected maximum bending deviation.

In an easy manner, the expected maximum bending deviation of the recording stack can be reduced by adapting at least one of the previously described first parameters in such a way that the expected maximum bending deviation does not exceed the admissible bending deviation threshold. It shall be understood that all, some or only one previously mentioned first process parameters can be adjusted for meeting the bending deviation threshold. It shall be understood that the previously described first parameters are only examples.

According to a preferred embodiment of the method according to the invention, prior to the irradiating step the expected maximum bending deviation can be determined by calculating the expected maximum bending deviation $\xi_{max}$ based on the equation $$\xi_{max} = A \cdot (|d_{sup}(0,\sigma)| \cdot |CTE| \cdot R^2_{dim} \cdot \beta(\tau_{exp})), \qquad (b)$$

wherein A is a pre-definable scaling factor, $d_{sup}$ is the normalized bending deformation function of the supporting element, CTE is the coefficient of thermal expansion of the recording stack, $R_{dim}$ is the ratio of the lateral dimensions of the recording stack to the thickness of the recording stack, and $\beta(\tau_{exp})$ is a function depending on the normalized exposure time $\tau_{exp}$. As can be directly seen from equation (b), the expected maximum bending deviation $\xi_{max}$ can be reduced by reducing at least one of the adjustable first parameters $|CTE|$, $R^2_{dim}$ or $\beta(\tau_{exp})$.

Furthermore, it has been found that the admissible bending deviation threshold, i.e. the value which should not be exceeded for reducing the risk of fringes, may have different values. In particular, the admissible bending deviation threshold may depend on second process parameter. According to a preferred embodiment, the method can comprise the following steps:
  providing at least one second process parameter,
    wherein the bending deviation threshold depends on the at least one second process parameter, and
  determining the bending deviation threshold for the recording stack depending on the at least one second process parameter.

By determining, e.g., calculating the bending deviation threshold depending on the second process parameter/s, an optimal bending deviation threshold can be determined. For instance, for a first value of at least one second process parameter fringes occur if a first bending threshold is exceeded while for another value of the at least one second process parameter fringes only occur when a second bending threshold, which may be larger (or smaller) than the first bending threshold, is exceeded. The determination of the optimal bending threshold depending on at least one second process parameter may have the advantage that merely a small adjustment of at least one first process parameter must be performed for avoiding the occurrence of fringes.

Preferably, the at least one second process parameter is the slant angle $\alpha$ of the grating vector K of the at least one recording beam and/or the grating spacing $\Lambda$ of the at least one recording beam. The slant angle is the angle between the grating vector K of the recorded grating and the recording stack surface. In particular, the bending deviation threshold and the occurrence of fringes, respectively, depend on the orientation of the grating vector K towards the recording stack surface and the grating spacing $\Lambda$ (inverse spatial frequency). Especially, it depends on whether a transmission or a reflection hologram is generated. Thereby, fringe formation is more severe for reflection holograms which have sub-wavelength grating spacings $\Lambda$ and the grating layers are more or less perpendicular to the potential movement direction of the deforming recording stack.

According to a preferred embodiment, the bending deviation threshold $\xi_{max}$ is equal or smaller than $$\frac{\pi}{2K_z},$$

wherein $K_z$ is the component of the grating vector K parallel to the thickness direction of the recording stack. More particularly, it has been found that if the product $|\xi_{max} * K_z|$ is larger than $$\frac{\pi}{2},$$

fringes occur while if the product $|\xi_{max} \cdot K_z|$ is equal or smaller than $$\frac{\pi}{2},$$

fringes do not occur. It can be guaranteed in an easy manner that no fringes occur during the production.

In another preferred embodiment of the method according to the invention, in the irradiating step the recording stack can be irradiated by a reference beam and by an object beam. The object beam may be the beam that carries the information to be stored in the recording element and optical holographic element, respectively. For instance, the object beam is the beam which is reflected off the object or which has passed the object. When the two beams reach the recording element, their light waves intersect and interfere with each other. It is this interference pattern that is imprinted on the recording medium.

Furthermore, the reference beam and the object beam are preferably generated by the same light source. The light source may comprise more than one light generator, like three monochromatic lasers which are superimposed by suitable optical elements. A light beam splitter can be configured to split the beam emitted from the light source into the reference beam and a light beam configured for passing an object. Two beams having the same properties (wavelength, etc.) can be generated in a simple manner. According to another embodiment, at least one of the reference beam or reconstruction beam can be generated by a laser, a laser diode or a directional light source.

The recording element can comprise any suitable recording material. In preferred embodiments, the recording element may comprise a photoresist material, photopolymer material, silver halide material, di-chromated gelatine material, photo-chromic material or photo-refractive material.

In particular, the recording element may preferably comprise a photopolymer film comprising a cross-linked matrix and writing monomers, preferably comprising a cross-linked matrix and acrylate based monomers. Such a material is particular suitable for forming a beam shaping holographic optical element.

Another aspect of the present invention is a holographic optical element produced by the previously described method. In particular, the holographic optical element is a beam shaping holographic optical element. The holographic optical element has a high quality without any fringes.

In a preferred embodiment of the holographic optical element according to the present invention, the holographic optical element may be a reflection-type holographic optical element, a transmission-type holographic optical element or an edge-lit holographic optical element or a combination of thereof. As previously pointed out, the admissible bending threshold may depend on the type of the holographic optical element.

A further aspect of the present invention is a display device comprising the previously described holographic optical element. Preferably, the display device may be a liquid crystal display device. For instance, the display device may be a mobile device, a game computer, a tablet computer, a stand-alone monitor, a television device, an advertising panel, or the like.

These and other aspects of the present patent application become apparent from and will be elucidated with reference to the following figures. The features of the present application and of its exemplary embodiments as presented above are understood to be disclosed also in all possible combinations with each other.

FIG. 1 shows a schematic view of a holographic optical element 102 with a fringe 120. The holographic optical element 102 is a recording element which has been irradiated by at least one recording beam to form a desired pattern. Generally, it is desired to obtain a holographic optical element 102 having homogeneous diffraction efficiency. However, as can be seen from the example in FIG. 1, the holographic optical element 102 comprises a ring-shaped darkening 120 (see the cross-hatched area). In other words, the depicted holographic optical element 102 comprises a fringe 120.

As described above, such fringes reduce the quality of a holographic optical element, and thus, should be avoided. Before explaining an embodiment of the method according to the invention, the recording arrangement for performing the method will be described in the following.

Figure 2A:
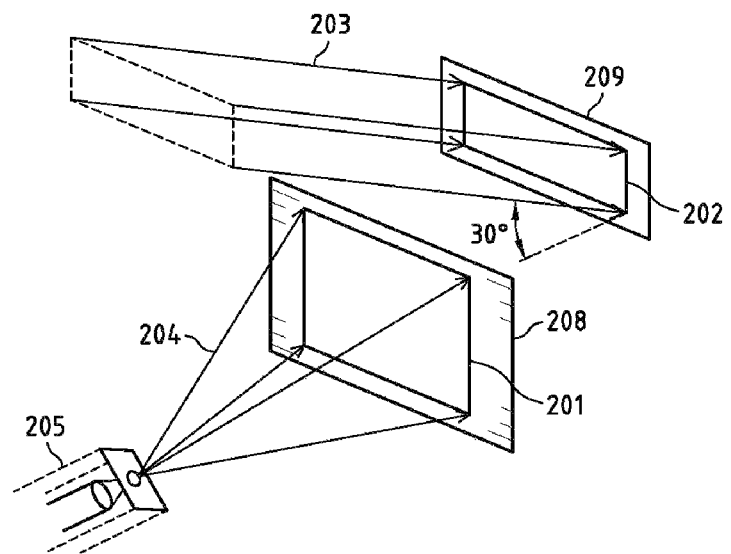
FIG. 2a is a schematic view of an embodiment of an arrangement for performing the method for producing a holographic optical element according to the present invention.
Figure 2B:
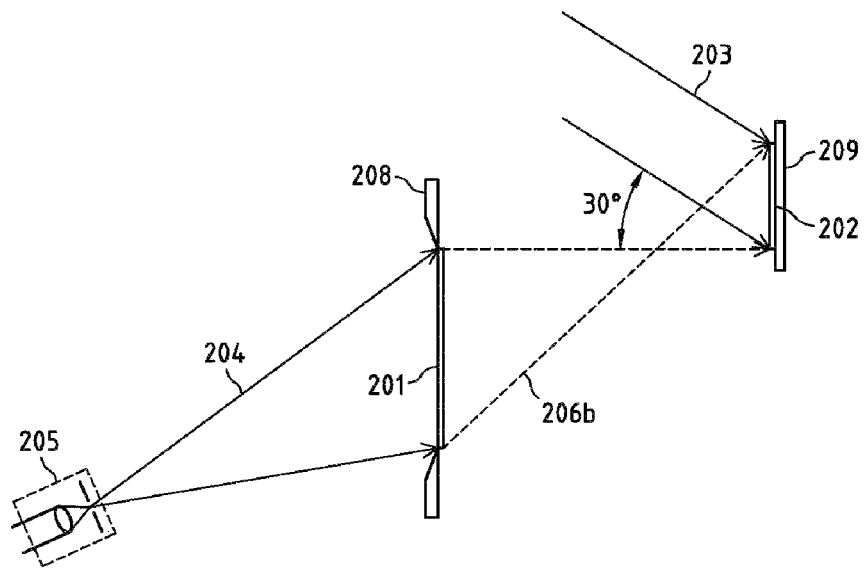

FIG. 2a shows a perspective view of the recording geometry of a transmission type holographic optical element 202. FIG. 2b shows a side view of this recording geometry of the holographic optical element 202.

From a common laser light source (not shown) after a suitable beam splitter a spatial filter 205 can generate a divergent illumination beam 204 for an object 201. The object 201 itself may be a diffusor sheet (e.g., Makrofol® LM 322 2-4, 300 μm thick, made by Bayer MaterialScience AG) made from polycarbonate. It shall be understood that other components and/or materials can be used.

The opening of e.g., 66 mm by 110 mm can be generated by a mask 208 of respective aperture. The optical axis of the illumination light can be aligned along the centres of the object 201 and a recording element 202. The recording element can be laminated on a supporting element 209. Both recording element 202 and supporting element 209 form the recording stack.

A first recording beam 206b can be generated by the object 201 and the divergent illumination beam 204. The recording beam 206b, i.e. the object beam 206b, in particular a diffuse light beam 206b, generated by the object 201 (most effectively) covers the area of the recording element 202. A further recording beam, in particular, a collimated reference beam 203 which is generated by using e.g. a folding mirror, is directed at an angle $\theta_R$ of 30° on the recording element 202 with respect to its surface normal. The active diameter of this folding mirror can be chosen equal to the diameter of the recording element 202 as its minimum value. In the present example, the diameter may be equal to 115.43 mm.

The collimated reference beam 203 and the divergent illumination beam 204 used for generating the object beam 206b can be preferably generated from a super-position of red, green and blue laser co-aligned light.

The supporting element 209 can be e.g., a float glass plate 209. The float glass plate 209 may have a thickness of approximately 3 mm. The lateral dimension of the float glass plate 209 may be 90 mm by 120 mm. It shall be understood that other dimensions can also be chosen, as will be described hereinafter. As a recording element 202, a photopolymer film can be laminated with the photopolymer layer towards the glass surface of the supporting element 209. The substrate side of the photopolymer film can be directed towards the other side, which may be air. Preferably, the recording stack comprising the recording element 202 and the supporting element 209 can be oriented with the photopolymer film side towards the collimated reference beam 203. The substrate side of the photopolymer film can face the air. The collimated reference beam 203 may thus enter the recording stack via the photopolymer film.

Figure 3:
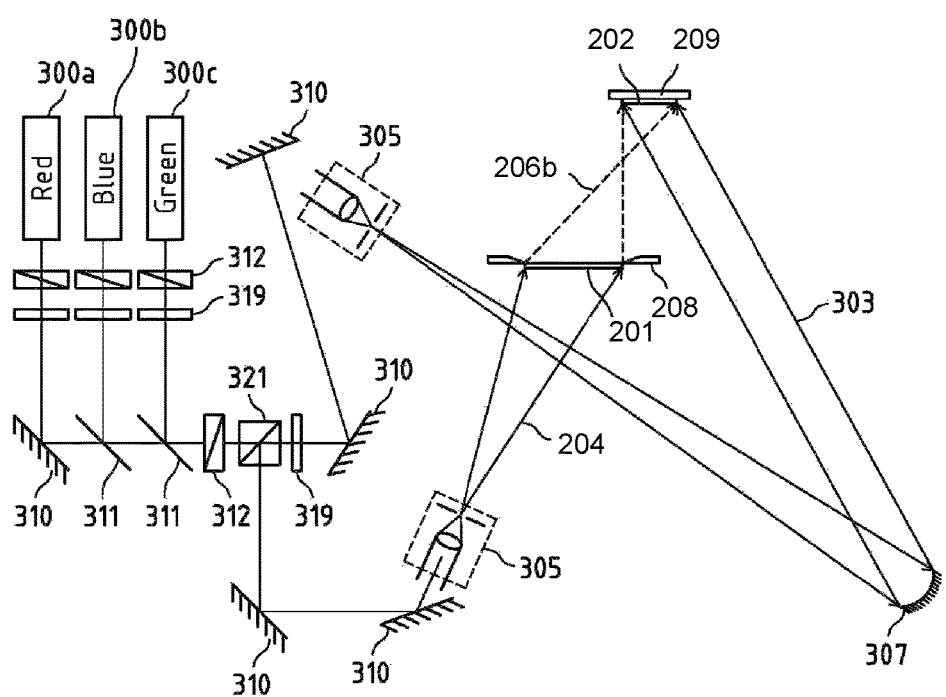
FIG. 3 is a schematic view of a further embodiment of an arrangement for performing the method for producing a holographic optical element according to the present invention.

FIG. 3 shows a further (more detailed) embodiment of an arrangement for performing the method for producing a holographic optical element 302 according to the present invention.

Reference sign 300a denotes a red laser, reference sign 300b denotes a blue laser, and reference sign 300c denotes a green laser as light source. For the red laser 300a a Krypton Ion laser (Coherent, Innova Sabre) 300a with a specified output power of 2.1 Watt at 647 nm in single frequency mode can be used. For the green laser 300b a DPSS laser (Coherent Verdi V5) 300b with a specified output power of 5 Watt at 532 nm in single frequency mode can be used. Finally, for the blue laser 300c an Argon Ion laser (Coherent, Innova 305) 300c with a specified output power of 0.9 Watt at 488 nm can be used.

Furthermore, as can be seen from FIG. 3, individual shutters 312 configured for blocking a laser beam are provided. In particular, each of these lasers 300 can be blocked by individual shutters 312 directly after the laser output. In addition, a main shutter 312 may be provided. The main shutter 312 may be configured to control the simultaneous exposure time $t_{exp}$ for all three laser wavelengths. The beam ratios between the power density of the reference beam $P_{ref}$ and the object beam $P_{obj}$ of each individual laser wavelength λ could be adapted with the half wave plates 319 located after the individual shutters 312 and the polarizing beam splitter 321.

The three laser beams are co-aligned by the aid of one mirror 310 and two dichroic mirrors 311. It shall be understood that other means can be used. The reference beam 303 is expanded by a spatial filter 305 and directed on a spherical mirror 307. In the present example, the focal length is set to 3 m. The pin hole of the spatial filter 305 is preferably placed into the focal point of the spherical mirror 307. The spatial filter 305 and the spherical mirror 307 are configured to generate the collimated reference beam 303.

Figure 4A:
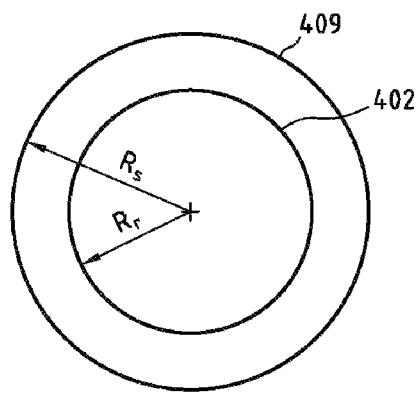
FIG. 4a is a schematic view of an embodiment of a recording stack comprising a recording element and a supporting element according to the present invention, wherein the recording stack is in an initial state.
Figure 4B:
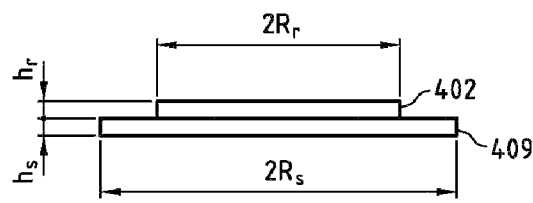
Figure 4C:
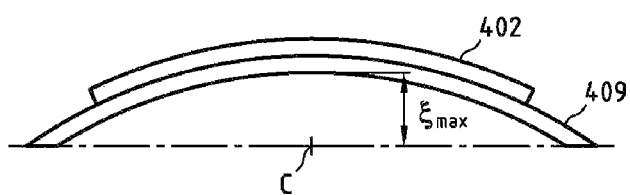
FIG. 4c is a schematic view of the embodiment shown in FIGS. 4a and 4b, wherein the recording stack is in a bent state.

FIG. 4a shows a schematic view of an embodiment of a recording stack comprising a recording element 402 and a supporting element 409 according to the present invention. FIG. 4b shows a schematic side view of the embodiment shown in FIG. 4a. Both FIGS. 4a and 4b show the recording stack in an initial state or initial position, i.e. prior to the recording and irradiating step, respectively. FIG. 4c shows a schematic side view of the embodiment shown in FIGS. 4a and 4b. The recording stack shown in FIG. 4c is in a bent state.

The recording element 402 is laminated on the supporting element 409. In the shown embodiment, the supporting element 409 and the recording element 402 are thin and ring-shaped plates. It shall be understood that according to other variants of the present invention, the form of at least one of the recording element and supporting element may be different. For instance, at least one of these elements may have a rectangular form.

In the present example, the supporting element 409, like a glass plate 409, has a radius $R_s$ and the recording element 402 has a radius $R_r$. Furthermore, as can be seen from FIG. 4a, the radius $R_s$ is larger than the radius $R_r$. The radius R of the recording stack is therefore radius $R_s$. In addition, the supporting element 409 has a thickness $h_s$ and the recording element 402 has a thickness $h_r$. The thicknesses $h_s$ and $h_r$ may be approximately equal or different. The thickness h of the recording stack is therefore $h=h_s+h_r$.

In the method for producing the holographic optical element, the recording stack comprising the recording element 402 and the supporting element 409 is bent. FIG. 4c shows an exemplified embodiment of a bent recording stack. In particular, compared to the (approximately) planar recording stack shown in FIG. 4b, the recording stack is bent. Thereby, the maximum bending deviation $\xi_{max}$ occurs at the center C of the recording stack.

According to the present invention it has been found that fringes (likely) occur if the maximum bending deviation $\xi_{max}$ exceeds a defined bending deviation threshold $\xi_{thr}$, i.e., if $\xi_{max} > \xi_{thr}$. For demonstrating that the fringe formation depends on the bending behaviour of the recording element, the following tests can be made.

In a first test, a recording element is laminated on a supporting element. The recording can be done in a $\theta_O=0°/\theta_R=30°$ transmission geometry with e.g., a green laser ($\lambda=0.532$ μm). As a recording element, a photopolymer film is laminated on top of a 10 mm thick glass plate acting as a supporting element of the size of width=450 mm by height=600 mm. The photopolymer film is directed towards the laser during recording. The resulting or produced holographic optical element shows a dark fringe. In a further test, the recording is performed in the same way with only one difference. The photopolymer film is sandwiched between two supporting elements, for example two glass plates. The resulting holographic optical element does not show a fringe. It is noted that the present sandwich solution is not practical due to e.g., pressure marks on the produced holographic optical element.

The above observations imply that the fringe formation must have been caused by a movement and/or a bending of the recording element during the recording process. If for example the object beam (e.g. the diffusor) or the reference beam would have moved or would have changed their shape or wavefront, fringes should have appeared in the reconstructed real image or should be visible in the real time interferometric setup. The latter means one observes the virtual image or the reference beam looking through the generated holographic element and both reference and object beam are on.

Neither in the real image nor in the real time interferometric setup respective fringes could be observed. As in a symmetrical setup no fringe formation occurs the recording plate bending and/or its movement must be caused by the photopolymer film itself in an asymmetric recording stack and only during the period of exposure.

Furthermore, it has been found that the reason for the bending deviation, and thus, for the fringe formation is the asymmetric heating of the recording stack. Generally, there could be two sources of this fringe formation in an asymmetric setup. The first one is shrinkage of the recording element during the irradiation step and the second one is asymmetric heating of the recording stack.

Shrinkage is caused due to the volume reduction by photopolymerization in for example acrylate based photopolymers. In the flat recording stack setup in which the photopolymer is adhered to the supporting element, e.g. a glass plate, the volume shrinkage is completely transferred in a thickness shrinkage s. However at the edges of the holographic optical element area the translational symmetry along the plate surface is broken and shear stresses might occur. This will give raise to torques that finally could bend the full recording stack.

To investigate this theory in more detail a large size recording element can be used in a recording experiment. In a first test, fringe can be observed after the irradiating step. The same test is repeated. But in the repeated test, the laminated photopolymer layer is cut through the substrate down to the glass plate into small rectangles (similar size of the small size recording element) before exposure. The result of this test is that the fringe formation still occurs. Hence, shrinkage can be excluded from the possible sources of fringe formation.

As shrinkage can be excluded from the possible sources of fringe formation, the only possibility to bend the recording stack is by asymmetric heating. That means that by the interaction with the recording light of at least one recording beam, one surface of the recording stack has a different temperature than the second surface during the exposure period. By thermal expansion this temperature difference over the thickness of the e.g. glass supporting plate can lead to a bending of the supporting element, and thus, to a bending of the total recording stack.

Furthermore, asymmetric heating during the recording process and irradiating process, respectively, can only happen either by conversion of the absorbed light into heat and/or by the heat of reaction (always during the exposure interval of duration $t_{exp}$). In case of a photopolymer the heat of reaction is equal to the heat of polymerization. It has been found that the main source for the asymmetric heating during the recording process in photopolymers for example is the heat of polymerization. In more detail, in case of the exothermic heat of polymerization the adiabatic temperature increase $T_{ad}$ can be calculated by:

$$T_{ad} = \frac{\Delta H_P}{c_P} \cdot f(t_{exp}) \qquad (c)$$

wherein $f(t_{exp})$ denotes the fraction of full conversion which can be achieved during the exposure interval, $c_P$ is the heat capacity per volume of the recording stack and $\Delta H_P$ is the exothermic heat of polymerization of the photopolymer layer.

In case of absorption the adiabatic temperature increase $T_{ad}$ can be calculated by:

$$T_{ad} = \frac{E}{d \cdot c_P} \cdot \frac{100 - T_{ini} - \text{Fresnel losses}}{100\%} \cdot 10 \quad (d)$$

wherein E is the recording dosage, $T_{ini}$ is its initial transmission at the recording wavelength $\lambda$, and d is the thickness of the photoactive recording layer. Thereby, it is assumed that the sample does not bleach during $t_{exp}$.

If typical values of the respective variables are put into the equation (c) and equation (d), the resulting values differ from each other by a factor of approximately 10. In particular, the effect of the heat of polymerization is more than 13 times larger than that of the absorption of the recording light. Therefore it would be more fruitful to avoid fringe formation in concentrating on photopolymer formulations with low $\Delta H_P$ or keeping $f(t_{exp})$ small, which means profiting from a long lasting dark reaction to achieve a high efficiency. Note that the photopolymer formulation could be optimized to allow a long lasting and efficient dark reaction.

After pointing out the source of the occurrence of fringes, in the following an embodiment of a method according to the present invention will be elucidated.

Figure 5:
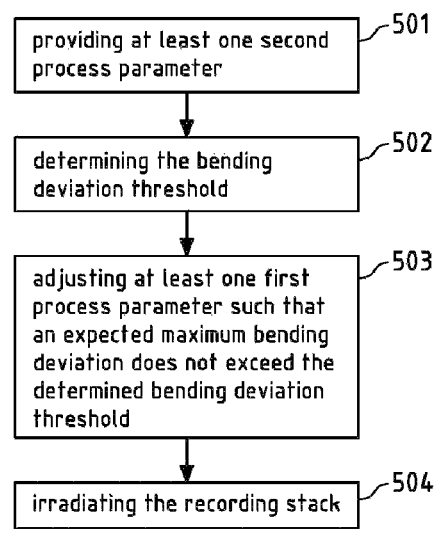
FIG. 5 is an example diagram of an embodiment of the method according to the present invention.

FIG. 5 shows an exemplified diagram of an embodiment of the method according to the present invention.

In a first step 501, at least one second process parameter is provided. The at least one second process parameter is responsible for the occurrence of a fringe. In more detail, the occurrence of a fringe depends on the exceeding of a bending deviation threshold $\xi_{thr}$. This threshold $\xi_{thr}$ depends on at least one second process parameter. In other words, depending on at least one second process parameter, a higher or lower bending during the irradiating step may be acceptable.

The second process parameter may be the slant angle $\alpha$ and/or the grating spacing $\Lambda$ of the interference pattern formed by the at least on recording beam and/or the orientation of the resulting grating vector K. More particularly, it has been found that the average fringe visibility V can be calculated by the following equation:

$$V = V_0 \cdot \frac{1}{\tau_{exp}} \cdot \int_0^{\tau_{exp}} \cos\left(\frac{2 \cdot \pi \cdot \sin(\alpha)}{\Lambda} \cdot \xi\right) d\tau \quad (e)$$

wherein $V_0$ is the fringe visibility of the interference pattern generated by the at least one recording beam, $\Lambda$ is the grating spacing and $\alpha$ is the slant angle. For example $V_0$ can be equal to 1 if the reference beam and the object beam have the same power. In general $V_0$ is in the range between 0 and 1.

In particular, depending on $$\frac{2 \cdot \pi \cdot \sin(\alpha)}{\Lambda}$$

the bending deviation threshold $\xi_{thr}$ can be determined such that only an exceeding of this threshold would result in a holographic optical element which comprises undesired fringes (step 502). In particular, the bending deviation threshold $\xi_{thr}$ depends on the type of recording scheme, like transmission scheme or reflection scheme, due to the influence of the slant angle $\alpha$.

It shall be understood that in other variants of the present invention the bending deviation threshold can also be determined in another way and can e.g. purely determined by experimental reference.

As described hereinbefore, in step 502, the bending deviation threshold $\xi_{thr}$ is determined. In particular, depending on the at least one second process parameter, the bending deviation threshold $\xi_{thr}$ can be determined. For instance, the bending deviation threshold $\xi_{thr}$ can be calculated. The bending deviation threshold $\xi_{thr}$ is chosen such that if the maximum bending deviation threshold $\xi_{max}$ during the recording step and irradiating step, respectively, is less than the bending deviation threshold $\xi_{thr}$, a fringe will not occur.

Furthermore, in step 503, at least one first process parameter is adjusted in such a way that in the following irradiating step (step 504) the maximum bending deviation $\xi_{max}$ does not exceed the previously determined bending deviation threshold $\xi_{thr}$. In particular, prior to the irradiating step the expected maximum bending deviation $\xi_{max}$ can be calculated on the following equation such that $\xi_{max} < \xi_{thr}$. Bearing in mind that we have identified the cause for the bending of the recording stack is the asymmetric heating by the heat of polymerization, the factor A given earlier in equation (b) has to be substituted by $A = 6/\pi^2 \cdot (T_{ad} \cdot d)$. d is the thickness of the photoactive recording layer. $T_{ad}$ is the adiabatic temperature increase by the exothermic heat of polymerization.

$$\xi_{max} = \frac{6}{\pi^2} \cdot (T_{ad} \cdot d) \cdot (|d_{sup}(0, \sigma)| \cdot |CTE| \cdot R_{dim}^2 \cdot \beta(\tau_{exp})) \quad (b1)$$

For instance, a supporting element having a low absolute value of the CTE can be used and/or the geometric dimensions can be adjusted for reducing $R_{dim}^2$ and/or the normalized exposure time $\tau_{exp}$ and energy dosage E, respectively, can be adjusted for meeting the determined bending deviation threshold $\xi_{thr}$. Thereby, $\beta(\tau_{exp})$ is given as $$\beta(\tau_{exp}) = \frac{\Gamma_{isothermal}(\tau_{exp})}{\tau_{exp}} \quad (f)$$

with $$\Gamma_{isothermal}(\tau_{exp}) = \sum_{n=1}^{\infty} \left( \frac{\pi^2 \cdot (2 \cdot n - 1/2) \cdot (-1)^n + 2}{4 \cdot (2 \cdot n - 1/2)^4} \cdot \left(1 - \exp\left(-\tau_{exp} \cdot (2 \cdot n - 1/2)^2\right)\right) \right) \quad (g)$$

The thermal diffusion time $\tau_0$ of the float glass comprising the supporting structure of the recording layer stack is given as:

$$\tau_0 = \frac{h^2}{\pi^2 \cdot D} \quad (h)$$

D is the thermal diffusion coefficient of the float glass comprising the supporting structure of the recording layer stack. The reduced exposure time $\tau_{exp}$ is given as:

$$\tau_{exp} = \frac{t_{exp}}{\tau_0}. \quad \text{(i)}$$

$d_{sup}(\rho, \sigma)$ is given as $$d_{sup}(\rho, \sigma) = \left[ \frac{3}{2 \cdot \sigma - 1} \cdot (1 - \rho^2) + 2 \cdot \frac{1 + \sigma}{2 \cdot \sigma - 1} \rho^2 \cdot \ln(\rho) \right] \quad \text{(j)}$$

wherein $\rho$ is the normalized radial coordinate and $\sigma$ is the Poisson ratio of the recording stack. $d_{sup}$ describes the bending of recording stack if the recording plate's edges ($\rho=1$) are supported by a fixture to a frame which means that $d_{sup}(\rho=1, \sigma)$ is essentially equal to 0 along those edges.

Then, after the recording setup has been adjusted, the recording stack comprising the recording element and the supporting element is irradiated in step 504. In particular, the recording stack is irradiated by an object beam and a reference beam, as explained above. The result of the irradiating step is a holographic optical element comprising a desired pattern without any fringes.

In the following, some exemplified recording results are given:

In a first example, the recording dosage E is 15 mJ/cm$^2$ and the exposure time $t_{exp}$=100 s which corresponds to a power density P=150 µW/cm$^2$. This is a typical power value at the upper level that can be achieved if a large size holographic optical element is recorded with a laser of an output power of 1 to 2 Watts. The factor f in equation (c) has to be set to 0.5 for this recording dosage and the photopolymer used. If the radius R of the supporting element is taken as the maximum recording stack extension (holographic optical element with the width of the holographic optical element of 312 mm and the height of the holographic optical element of 532 mm) it ends up with R=600/2 mm. Then the thickness d of the recording layer is 15 µm and the adiabatic temperature increase $T_{ad}$ is 33.25 K.

The following table 1 shows the maximum bending deviation $\xi_{max}$ for a variation of the thickness h of the recording stack with float glass used as supporting structure for the recording stack, the radius R=600/2 mm of the recording stack and the exposure time $t_{exp}$=100 s.

TABLE 1

| h (mm) | 0.5 | 1 | 3 | 10 | 19 | 30 |
|---|---|---|---|---|---|---|
| $\tau_0$ (s) | 0.072 | 0.27 | 2.6 | 29 | 103 | 258 |
| $\tau_{exp}$ | 1389 | 370 | 39 | 3.5 | 0.97 | 0.39 |
| $\frac{\Gamma_{isothermal}(\tau)}{\tau_{exp}}$ | 0.00071 | 0.0027 | 0.026 | 0.28 | 0.66 | 0.86 |
| $R^2_{dim} = R^2/h^2$ | 360000 | 90000 | 10000 | 900 | 249 | 100 |
| $\xi_{max}$ (µm) | 0.56 | 0.56 | 0.56 | 0.54 | 0.35 | 0.18 |

As can be seen from table 1, for small h the $\xi_{max}$ value does not depend at all on h, whereas after a certain cross over value of h, $\xi_{max}$ starts to decay with increasing h. This cross over occurs around $\tau_{exp}$=1. Therefore increasing the recording stack thickness h will not reduce the recording stack bending in all cases but only if a critical value of the thickness h has been overcome. Below this critical value of the thickness h the maximum bending deviation $\xi_{max}$ depends then solely on the absolute value of the CTE and the $R^2$ if the exposure time $t_{exp}$ is fixed.

The following table 2 shows the maximum bending deviation $\xi_{max}$ for a variation of the exposure time $t_{exp}$ for float glass used as a supporting structure of the recording stack, the radius R=600/2 mm of the recording stack and a thickness h=10 mm of the recording stack. For this case it is again assumed that the recording dosage E is fixed at 15 mJ/cm$^2$. If the exposure time $t_{exp}$ is varied the recording is done at different power densities P.

TABLE 2

| $t_{exp}$ | 0.001 | 0.01 | 0.1 | 1 | 10 | 100 | 1000 |
|---|---|---|---|---|---|---|---|
| $\tau_0$ (s) | 29 | 29 | 29 | 29 | 29 | 29 | 29 |
| $\tau_{exp}$ | 0.000035 | 0.00035 | 0.0035 | 0.035 | 0.35 | 3.5 | 35 |
| $\frac{\Gamma_{isothermal}(\tau)}{\tau_{exp}}$ | 1.22 | 1.22 | 1.20 | 1.12 | 0.87 | 0.28 | 0.029 |
| $R^2_{dim} = R^2/h^2$ | 900 | 900 | 900 | 900 | 900 | 900 | 900 |
| $\xi_{max}$ (µm) | 2.33 | 2.33 | 2.29 | 2.15 | 1.69 | 0.54 | 0.056 |

As can be seen from table 2, increasing the exposure time $t_{exp}$ for a fixed dosage E may reduce $\xi_{max}$.

Furthermore, it is noted that lowering the absolute value of the CTE and decreasing $\tau_0$ by increasing the thermal diffusion coefficient D of the supporting element helps in (almost) every case to reduce $\xi_{max}$.

Finally, tables 3a to 3c show further experimental results of twelve different recording setups and examples, respectively.

TABLE 3a

| Example | $T_{ad}$ (K) | $\lambda$ (μm) | Hologram Type | $\theta_R$ (°) | $\theta_O$ (°) | n | $\alpha$ (°) | $\Lambda$ (μm) |
|---|---|---|---|---|---|---|---|---|
| 1 | 33.25 | 0.532 | Transmission | 30 | 0 | 1.5 | 9.7 | 1.049 |
| 2 | 33.25 | 0.532 | Transmission | 30 | 0 | 1.5 | 9.7 | 1.049 |
| 3 | 33.25 | 0.532 | Transmission | 30 | 0 | 1.5 | 9.7 | 1.049 |
| 4 | 33.25 | 0.532 | Transmission | 30 | 0 | 1.5 | 9.7 | 1.049 |
| 5 | 33.25 | 0.532 | Transmission | 30 | −26 | 1.5 | 1.2 | 0.567 |
| 6 | 33.25 | 0.532 | Transmission | 30 | −26 | 1.5 | 1.2 | 0.567 |
| 7 | 33.25 | 0.532 | Reflection | 8 | −26 | 1.5 | 84.2 | 0.181 |
| 8 | 33.25 | 0.532 | Reflection | 8 | −26 | 1.5 | 84.2 | 0.181 |
| 9 | 33.25 | 0.532 | Reflection | 8 | −26 | 1.5 | 84.2 | 0.181 |
| 10 | 33.25 | 0.532 | Reflection | 8 | −26 | 1.5 | 84.2 | 0.181 |
| 11 | 33.25 | 0.532 | Reflection | 0 | 0 | 1.5 | 90.0 | 0.177 |
| 12 | 33.25 | 0.532 | Reflection | 0 | 0 | 1.5 | 90.0 | 0.177 |

TABLE 3b

| Example | h (mm) | R (mm) | Glass | Fixture | Thermal Coupling | Mechanical Symmetry | Fill Factor | CTE ($10^{-6}$/K) |
|---|---|---|---|---|---|---|---|---|
| 1 | 10 | 300 | Float | Supported | Isothermal | Asymmetric | 1 | 7 |
| 2 | 19 | 300 | Float | Supported | Isothermal | Asymmetric | 1 | 7 |
| 3 | 10 | 300 | Float | Supported | Isothermal | Asymmetric | 0.33 | 7 |
| 4 | 10 | 300 | Float | Supported | Isothermal | Symmetric | 1 | 7 |
| 5 | 10 | 300 | Float | Supported | Isothermal | Asymmetric | 1 | 7 |
| 6 | 3 | 300 | Float | Supported | Isothermal | Asymmetric | 1 | 7 |
| 7 | 10 | 300 | Float | Clamped | Isothermal | Asymmetric | 1 | 7 |
| 8 | 6 | 300 | Nextrema ® | Clamped | Isothermal | Asymmetric | 1 | −0.54 |
| 9 | 3 | 60 | Float | Clamped | Isothermal | Asymmetric | 1 | 7 |
| 10 | 3 | 60 | Float | Clamped | Isothermal | Symmetric | 1 | 7 |
| 11 | 3 | 60 | Float | Clamped | Isothermal | Asymmetric | 1 | 7 |
| 12 | 3 | 60 | Float | Clamped | Isothermal | Asymmetric | 1 | 7 |

TABLE 3c

| Example | $t_{exp}$ (s) | $\tau_0$ (s) | $\tau_{exp}$ | $\xi_{max}$ (μm) | $K_z = 2\pi \cdot \sin(\alpha)/\Lambda$ (1/μm) | $\|K_z \cdot \xi_{max}\|$ | Fringes | Remarks |
|---|---|---|---|---|---|---|---|---|
| 1 | 200 | 28.66 | 6.98 | 3.550 | 1.01 | 3.58 | Yes | One circular fringe |
| 2 | 300 | 104.5 | 2.87 | 1.650 | 1.01 | 1.67 | Slight | Center Dip |
| 3 | 200 | 28.66 | 6.98 | 1.183 | 1.01 | 1.19 | No | |
| 4 | 200 | 28.66 | 6.98 | 0.000 | 1.01 | 0.00 | No | |
| 5 | 200 | 28.66 | 6.98 | 3.550 | 0.23 | 0.82 | No | |
| 6 | 200 | 2.61 | 76.78 | 4.210 | 0.23 | 0.98 | No | |
| 7 | 200 | 28.66 | 6.98 | 0.470 | 34.54 | 16.23 | Yes | Multiple circular fringes |
| 8 | 200 | 4.62 | 43.29 | 0.019 | 34.54 | 0.66 | No | |
| 9 | 100 | 2.61 | 38.39 | 0.045 | 34.54 | 1.55 | Slight | Center Dip |
| 10 | 100 | 2.61 | 38.39 | 0.000 | 34.54 | 0.00 | No | |
| 11 | 75 | 2.61 | 28.79 | 0.060 | 35.43 | 2.12 | Yes | One circular fringe |
| 12 | 150 | 2.61 | 57.58 | 0.030 | 35.43 | 1.06 | No | |

In the tables, the parameter $T_{ad}$ is the adiabatic temperature increase due to the exothermic heat of polymerization calculated according to equation (c) for the used photopolymer formulation having exothermic heat of polymerization $\Delta H_P = 133$ J/cm$^3$ and a heat capacity per volume of the recording layer stack $c_p = 2$ J/(cm$^3$·K) and a fraction of full conversion of $f(t_{exp}) = 0.5$ for the used recording dosage E of 15 mJ/cm$^2$ has to be used. $\lambda$ is the wavelength of the recording light in vacuum given in μm. Type refers to the character of the recording of the HOE. If the type is "Transmission" the reference and the object beam enter into the recording layer stack from the same side. If the type is "Reflection" the reference beam and the object beam enter into the recording layer stack from opposite sides. $\theta_R$ is the angle in air of the reference beam measured towards the surface normal of the recording layer stack. $\theta_O$ is the angle in air of the object beam measured towards the surface normal of the recording layer stack. The surface normal is always meant as the surface normal that directs out of the recording layer stack into the air of the respective half space in which the respective recording beam exists. n is the refractive index of the photopolymer. These parameters given the grating vector K and the slant angle $\alpha$ and the grating distance $\Lambda$ can be calculated inside the medium with refractive index n according to the usual manner known to a person skilled in the art of interference optics. Fixture describes how the recording plate comprising the recording stack was fixed to a frame during recording. If Fixture is "Supported" it means that $d_{sup}(\rho=1, \sigma)$ according to equation (j) is essentially equal to 0 along those edges. If Fixture is "Clamped" it means that $d_{cla}(\rho=1)$ is essentially equal to 0 and in addition $(dd_{cla}/d\rho)(\rho=1)$ according to equation (k) is essentially equal to 0 along those edges. In the clamped case equation (j) has to be replaced by equation (k) to estimate the maximum bending deviation $\xi_{max}$ in equation (b1).

$$d_{cla}(\rho)=[(1-\rho^2)+2\cdot\rho^2\cdot\ln(\rho)] \quad (k)$$

As can be directly seen from the above examples 1 to 12, fringes do not occur if the equation $$|K_z\cdot\xi_{max}|\leq\pi/2 \quad (l)$$

is met while fringes occur if the equation $$|K_z\cdot\xi_{max}|>\pi/2 \quad (m)$$

is met.

The invention claimed is:

1. A method for producing a holographic optical element from a photopolymeric recording medium, comprising:
   providing a substantially flat recording stack comprising at least one recording element that includes a photopolymeric material laminated on at least one supporting element,
   irradiating at least a part of the substantially flat recording stack with at least one recording beam in an irradiating step resulting in the recording stack bending,
   determining a bending deviation threshold for the recording stack, the bending deviation threshold determined through calculation; and
   adjusting at least one first process parameter such that a maximum bending deviation $\xi_{max}$ of the recording stack does not exceed the bending deviation threshold, wherein the at least one first process parameter influences the bending behavior of the recording stack during the irradiating step, and
   wherein the first process parameter is a ratio $R_{dim}$ of lateral dimensions of the recording stack to a thickness of the recording stack, a coefficient of thermal expansion (CTE) of the recording stack, a fill factor of a recording element area versus a supporting element area, exposure time $t_{exp}$ at a fixed recording dosage E or both the supporting element area and the exposure time $t_{exp}$,
   wherein the maximum bending deviation is determined prior to the irradiating step by calculating the maximum bending deviation $\xi_{max}$ based on equation $$\xi_{max} = A\cdot\left[\left|\frac{3}{2\sigma-1}\right|\cdot|CTE|\cdot R_{dim}^2\cdot\beta(\tau_{exp})\right]$$

if a fixture is supported, and based on equation $$\xi_{max}=A\cdot[1\cdot|CTE|\cdot R^2_{dim}\cdot\beta(\tau_{exp})]$$

if the fixture is supported and clamped,
   wherein A is a predefined scaling factor, σ is a Poisson ratio of recording stack, CTE is a coefficient of thermal expansion of the recording stack, $R_{dim}$ is a ratio of lateral dimensions of the recording stack to a thickness of the recording stack, and $$\beta(\tau_{exp}) = \frac{\Gamma_{isothermal}(\tau_{exp})}{\tau_{exp}}$$

and $$\Gamma_{isothermal}(\tau_{exp}) = \sum_{n=1}^{\infty}\left(\frac{\pi^2\cdot(2\cdot n-1/2)\cdot(-1)^n+2}{4\cdot(2\cdot n-1/2)^4}\cdot(1-\exp(-\tau_{exp}\cdot(2\cdot n-1/2)^2))\right).$$

2. The method according to claim 1, wherein the bending deviation threshold depends on at least one second process parameter, and
   the bending deviation threshold for the recording stack is further determined based on the at least one second process parameter,
   wherein the second process parameter is a slant angle, a grating vector of the recording element, a grating distance of the recording element or both the recording element and the grating distance.

3. The method according to claim 1, wherein the maximum bending deviation threshold $\xi_{max}$ is equal to or smaller than $$\frac{\pi}{2K_z},$$

wherein $K_z$ is a component of a grating vector in a thickness direction of the recording stack.

4. The method according to claim 1, wherein the recording stack is irradiated by a reference beam and by an object beam in the irradiating step.

5. The method according claim 4, wherein at least one of the reference beam or the object beam is generated by a laser, a laser diode or a directional light source.

6. The method according to claim 1, wherein the recording element further comprises photoresist material, silver halide material, di-chromated gelatine material, photo-chromic material or photo-refractive material.

7. The method according to claim 1, wherein the recording element comprises a photopolymer film comprising a cross-linked matrix and writing monomers comprising a cross-linked matrix and acrylate based monomers.

8. The method according to claim 1, wherein the supporting element is a glass plate made from borosilicate glass, glass, ceramic glass, fused silica fused quartz or a float glass plate.

9. The method according to claim 1, wherein the supporting element has an absolute value of a coefficient of thermal expansion (CTE) equal to or smaller than $7\times10^{-6}$ K$^{-1}$.

* * * * *